May 12, 1953 C. H. STOCKWELL 2,638,031

PROJECTION VIEWING AND CALCULATING DEVICE

Filed Oct. 22, 1949 5 Sheets-Sheet 1

INVENTOR.
Clifford H. Stockwell

BY Alex. E. MacRae

Attorney.

May 12, 1953 C. H. STOCKWELL 2,638,031

PROJECTION VIEWING AND CALCULATING DEVICE

Filed Oct. 22, 1949 5 Sheets-Sheet 2

INVENTOR.
Clifford H. Stockwell
BY Alex. E. MacRae
Attorney.

PROJECTION VIEWING AND CALCULATING DEVICE

| h ↓ \ H'-H''-H''' | 29000-29500-30000 | 28000-28500-29000 | 27000-27500-28000 | 26000-26500-27000 | 25000-25500-26000 | 24000-24500-25000 | 23000-23500-24000 | 22000-22500-23000 | 21000-21500-22000 | 20000-20500-21000 | 19000-19500-20000 | 18000-18500-19000 | 17000-17500-18000 | 16000-16500-17000 | 15000-15500-16000 | 14000-14500-15000 | 13000-13500-14000 | 12000-12500-13000 | 11000-11500-12000 | 10000-10500-11000 | 9000-9500-10000 | 8000-8500-9000 | 7000-7500-8000 | 6000-6500-7000 | 5000-5500-6000 | 4000-4500-5000 | 3000-3500-4000 |
|---|---|---|---|---|---|---|---|---|---|---|---|---|---|---|---|---|---|---|---|---|---|---|---|---|---|---|---|
| 0 | A | B | C | D | E | F | G | H | I | J | K | L | M | N | O | P | Q | R | S | T | U | V | W | X | Y | Z | Z' |
| 1000 | B | C | D | E | F | G | H | I | J | K | L | M | N | O | P | Q | R | S | T | U | V | W | X | Y | Z | Z' | Z'' |
| 2000 | C | D | E | F | G | H | I | J | K | L | M | N | O | P | Q | R | S | T | U | V | W | X | Y | Z | Z' | Z'' | |
| 3000 | D | E | F | G | H | I | J | K | L | M | N | O | P | Q | R | S | T | U | V | W | X | Y | Z | Z' | Z'' | | |
| 4000 | E | F | G | H | I | J | K | L | M | N | O | P | Q | R | S | T | U | V | W | X | Y | Z | Z' | Z'' | | | |
| 5000 | F | G | H | I | J | K | L | M | N | O | P | Q | R | S | T | U | V | W | X | Y | Z | Z' | Z'' | | | | |
| 6000 | G | H | I | J | K | L | M | N | O | P | Q | R | S | T | U | V | W | X | Y | Z | Z' | Z'' | | | | | |
| 7000 | H | I | J | K | L | M | N | O | P | Q | R | S | T | U | V | W | X | Y | Z | Z' | Z'' | | | | | | |
| 8000 | I | J | K | L | M | N | O | P | Q | R | S | T | U | V | W | X | Y | Z | Z' | Z'' | | | | | | | |
| 9000 | J | K | L | M | N | O | P | Q | R | S | T | U | V | W | X | Y | Z | Z' | Z'' | | | | | | | | |
| 10000 | K | L | M | N | O | P | Q | R | S | T | U | V | W | X | Y | Z | Z' | Z'' | | | | | | | | | |
| 11000 | L | M | N | O | P | Q | R | S | T | U | V | W | X | Y | Z | Z' | Z'' | | | | | | | | | | |
| 12000 | M | N | O | P | Q | R | S | T | U | V | W | X | Y | Z | Z' | Z'' | | | | | | | | | | | |
| 13000 | N | O | P | Q | R | S | T | U | V | W | X | Y | Z | Z' | Z'' | | | | | | | | | | | | |
| 14000 | O | P | Q | R | S | T | U | V | W | X | Y | Z | Z' | Z'' | | | | | | | | | | | | | |
| 15000 | P | Q | R | S | T | U | V | W | X | Y | Z | Z' | Z'' | | | | | | | | | | | | | | |
| 16000 | Q | R | S | T | U | V | W | X | Y | Z | Z' | Z'' | | | | | | | | | | | | | | | |
| 17000 | R | S | T | U | V | W | X | Y | Z | Z' | Z'' | | | | | | | | | | | | | | | | |
| 18000 | S | T | U | V | W | X | Y | Z | Z' | Z'' | | | | | | | | | | | | | | | | | |
| 19000 | T | U | V | W | X | Y | Z | Z' | Z'' | | | | | | | | | | | | | | | | | | |
| 20000 | U | V | W | X | Y | Z | Z' | Z'' | | | | | | | | | | | | | | | | | | | |
| 21000 | V | W | X | Y | Z | Z' | Z'' | | | | | | | | | | | | | | | | | | | | |
| 22000 | W | X | Y | Z | Z' | Z'' | | | | | | | | | | | | | | | | | | | | | |
| 23000 | X | Y | Z | Z' | Z'' | | | | | | | | | | | | | | | | | | | | | | |
| 24000 | Y | Z | Z' | Z'' | | | | | | | | | | | | | | | | | | | | | | | |
| 25000 | Z | Z' | Z'' | | | | | | | | | | | | | | | | | | | | | | | | |
| 26000 | Z' | Z'' | | | | | | | | | | | | | | | | | | | | | | | | | |
| 27000 | Z'' | | | | | | | | | | | | | | | | | | | | | | | | | | |

FIG. 5

INVENTOR.
Clifford H. Stockwell
BY Alex. E. MacRae
Attorney.

May 12, 1953 C. H. STOCKWELL 2,638,031

PROJECTION VIEWING AND CALCULATING DEVICE

Filed Oct. 22, 1949 5 Sheets-Sheet 4

INVENTOR.
Clifford H. Stockwell
BY Alex. E. MacRae
Attorney.

May 12, 1953 C. H. STOCKWELL 2,638,031

PROJECTION VIEWING AND CALCULATING DEVICE

Filed Oct. 22, 1949 5 Sheets-Sheet 5

INVENTOR.
Clifford H. Stockwell

BY

Attorney.

Patented May 12, 1953 2,638,031

UNITED STATES PATENT OFFICE 2,638,031

PROJECTION VIEWING AND CALCULATING DEVICE

Clifford H. Stockwell, Ottawa, Ontario, Canada

Application October 22, 1949, Serial No. 122,919

2 Claims. (Cl. 88—24)

This invention relates to a means for obtaining readings from graphs, charts and the like.

The invention will be described with particular reference to a means for obtaining ground elevations from parallax readings on aerial photographs.

In the usual parallax bar method of obtaining such elevations, it is common practice to use parallax tables which involve a certain amount of interpolation and a number of calculations. The calculations, though simple, are time consuming, especially when hundreds or thousands of determinations are to be made and, moreover, experience shows that they are a frequent source of error. It is usual to start a series of parallax readings at a control point of known elevation and to end the series at another point of known elevation. Corrections for tilt of the photograph, as revealed by the closing error, may subsequently be made.

It is a general object of this invention to provide a simplified means for conveniently and quickly obtaining desired readings and calculations from a plurality of variable factors.

It is a further object of this invention to provide a simplified and more convenient means for obtaining ground elevations from parallax readings on aerial photographs, wherein a substantial saving of time is effected and the possibility of error considerably reduced.

Another object is to provide a simple and effective viewing means for the graph.

Other objects, details and advantages of the invention will become apparent as the description proceeds, with particular reference to the accompanying drawing, in which, Figure 1 is a plan view of one part of the graph shown in skeleton form.

Figure 5 is a table of values, such as may be employed in conjunction with the graph.

In accordance with the invention, a graph consisting of two parts 1 and 2 is provided, each part being in elongated strip form as shown. Part 1 is provided with parallax readings for various focal and base lengths, while part 2 is provided with elevations for various flying heights. Knowing the flying height, focal length and base length, the graph is "set" by sliding one part relatively to the other until a control point of known elevation is opposite the corresponding parallax reading. Then, with this setting, the elevation of any other point (uncorrected for tilt) is read directly opposite its parallax reading.

The parallax equation used in the construction of both parts of the graph is $$p=\frac{fB}{H-h}$$

where $p$=the absolute parallax.
$f$=the focal length of the camera, in millimetres.
$B$=the photo base, that is, the distance between photo centers, in feet.
$H$=the height of the aeroplane, in feet, above sea level.
$h$=the height of the ground, in feet, above sea level.

Part 1 may be called the $p'$, $fB$ graph, where $p'$ is the parallax reading; part 2 may be called the $h$, $H$ graph.

Figure 1:
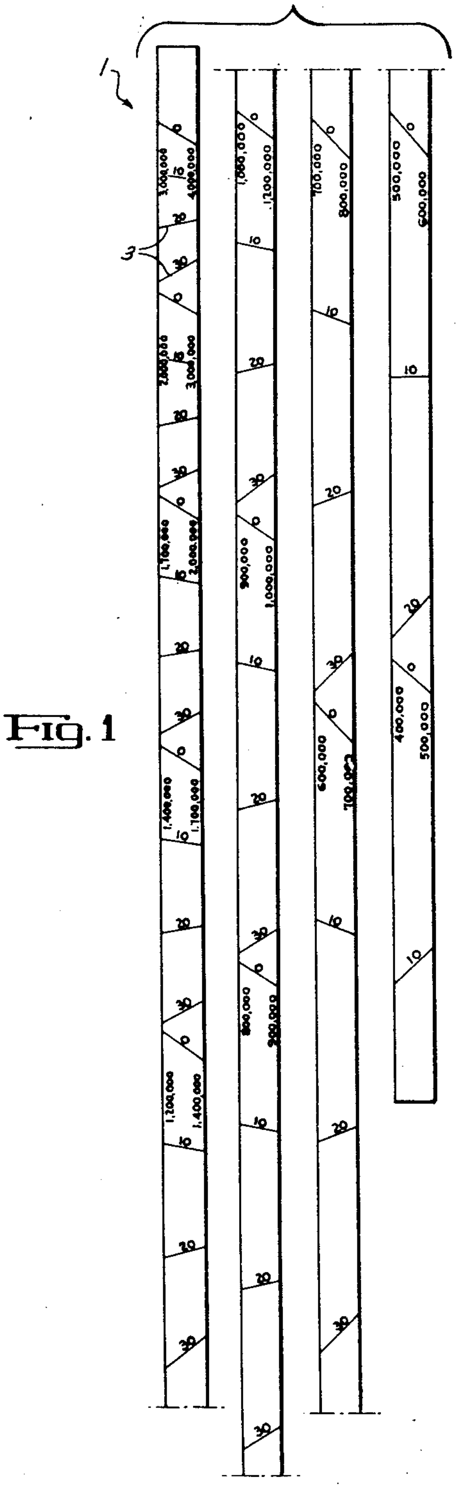
Figure 2:
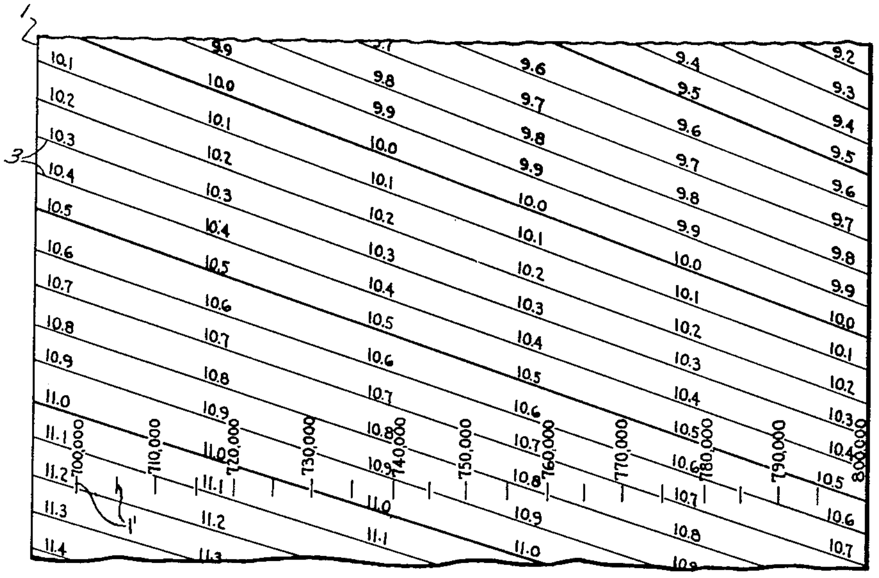
Figure 2 is a plan view of a portion of the graph part shown in Figure 1, in more detailed form.
Figure 6:
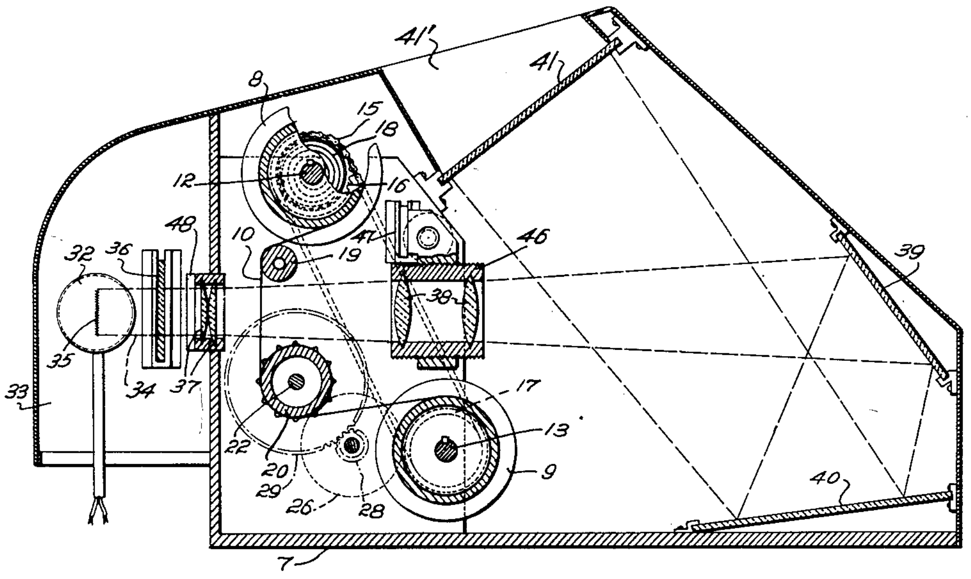
Figure 6 is a sectional side elevation of a calculating or viewing instrument for use with the graph.
Figure 8:
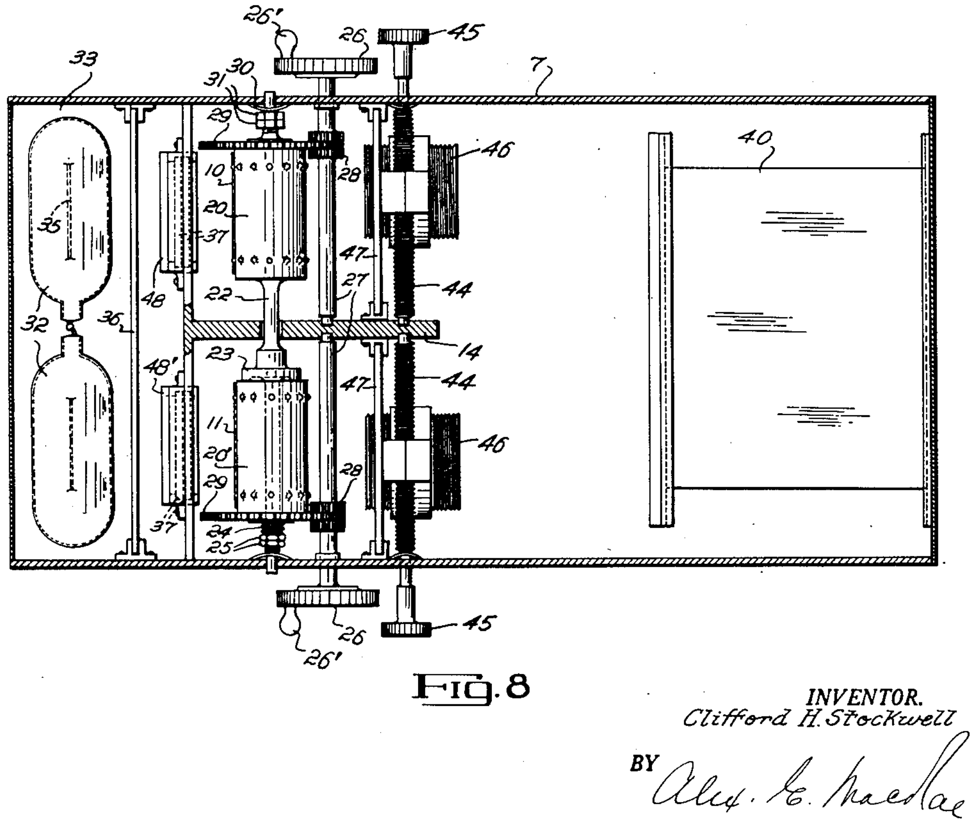
Figure 8 is a sectional plan view of the viewing instrument.
Figure 9:
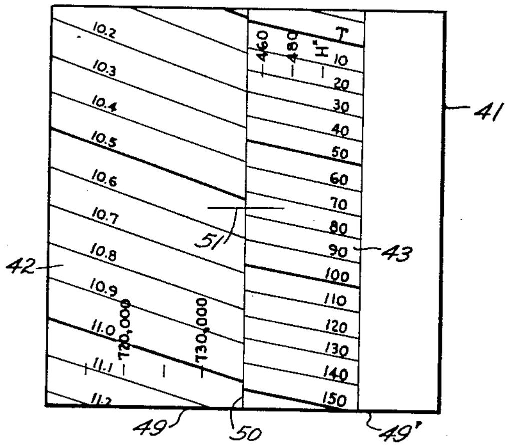
Figure 9 is a diagrammatic view of an image of the graph as produced by the instrument.
Figure 7:
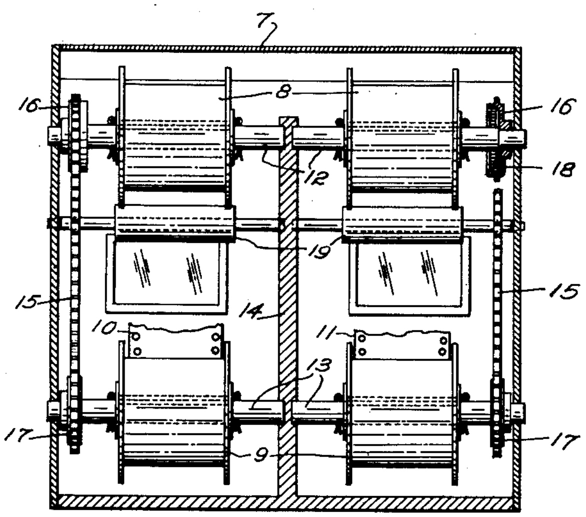
Figure 7 is a sectional end elevation of the viewing instrument.

The $p'$, $fB$ graph, or part 1, is constructed with $p'$ as ordinates and the product, $fB$, as abscissae. The $fB$ values are indicated as a plurality of parallel lines 1′ extending longitudinally of the strip and which are equally spaced at a scale of, say, .3 inch, for a difference of 5000 and remain equally spaced throughout the length of the diagram. Instead of continuing the division lines 1′ as solid lines extending throughout the length of the strip, they may comprise a series of short lines, as shown in Figure 2, which are repeated at intervals throughout the length of the graph part 1. At such intervals, a range of $fB$ values are indicated on the lines 1′. As shown by way of example in Figure 2, the lines 1′ indicate the product $fB$ plotted between the range $fB$=700,000 to $fB$=800,000. The ranges for each interval are indicated in Figure 1, the entire range in the graph illustrated being 400,000 to 4,000,000. The parallax values are plotted on the graph for each interval range of $fB$ values, as indicated in Figure 1. These are shown as gently sloping lines 3 which may be slightly curved and which are spaced at intervals of .1 parallax. The scale for these is constant for a fixed $fB$ value but varies inversely with changing values of $fB$. Thus, when the scale chosen for the parallax readings is .50 to 1 inch for $fB=1{,}000{,}000$, the scale for other values of $fB$ is obtained from the formula $$\frac{1{,}000{,}000\times S}{fB'}=S'$$

where S is the scale for $fB=1{,}000{,}000$ and S' is the scale for any other value, $fB'$. In the skeleton form shown in Figure 1, only parallax lines 0, 10, 20 and 30 are shown, but Figure 2 shows the intermediate lines to provide readings at intervals of .1 parallax.

The diagram on the graph gives directly all $fB$ values from 400,000 to 4,000,000. This amply covers the commonly encountered range. However, should any other value be required the same graph can be used by simply applying a factor of 10. For example, for an $fB$ value of 300,000 the graph for 3,000,000 can be used; or, for an $fB$ value of 5,000,000, the graph for 500,000 can be used.

It will be observed that the graph generally gives a range of from 0 to 30 in the parallax readings. This range has been chosen because it is the one generally covered by parallax bars. For low values of $fB$ a range 0–20, and 0–10 only is plotted merely to save space, as this range will generally be sufficient for such low values. For parallax differences greater than 30, the greater values are merely added on the parallax bar and, correspondingly, are added on the graph by making the necessary shift in its position.

A manner of constructing part 1 of the graph, when $10\ p'=1$ inch and $fB=1{,}000{,}000$, will now be described. On a vertical line representing $fB=1{,}000{,}000$, mark off points 0, 10, 20, and 30 on the scale of $10=1$ inch. Draw vertical line $fB=900{,}000$ at a distance of .3 inch to the left of vertical line $fB=1{,}000{,}000$ (i. e., the horizontal $fB$ scale is $1{,}000{,}000-900{,}000=100.000$ to .3 inch). When $fB=900{,}000$ the parallax (vertical) scale is $10p'$ to $$\frac{1{,}000{,}000\times 1}{900{,}000}=1.11\text{ inch}$$

On the vertical line representing $fB=900{,}000$, mark off points 0, 10, 20, 30 on the scale of 10 to 1.11 inch, the starting point, 0, having been chosen in a position such that, when points 0, 10, 20 and 30 on the 900,000 line are joined with the corresponding points on the 1,000,000 line, the slopes of the lines 0 and 30 are about equal, although in opposite directions. For convenience and in order to conserve space on the graph, line 15 is, arbitrarily, made approximately horizontal, and therefore lines with values less than 15 slope downwardly and those with values greater than 15 slope upwardly.

A similar procedure is employed for plotting the range $fB=800{,}000$ to $fB=900{,}000$ and so on down to the range 400,000 to 500,000, excepting that parallax lines 0 to 20 only are plotted in the range 500,000 to 600,000 and excepting that parallax lines 0 and 10 only are plotted in the range 100,000 to 500,000.

Also, a similar procedure is employed for plotting $p'$ values in the ranges 1,000,000–1,200,000 up to 3,000,000–4,000,000. In these sections of the graph, however, the $fB$ scale, instead of being 100,000 to .3 inch, is as follows:

Ranges 1,000,000–1,200,000–1,400,000: Scale 200,000 to .3 inch

Ranges 1,400,000–1,700,000–2,000,000: Scale 300,000 to .3 inch

Ranges 2,000,000–3,000,000–4,000,000: Scale 1,000,000 to .3 inch

These changes in the $fB$ scale are for the purpose of keeping the slopes of lines 0 and 30 at about the same angle in all cases.

Figure 3:
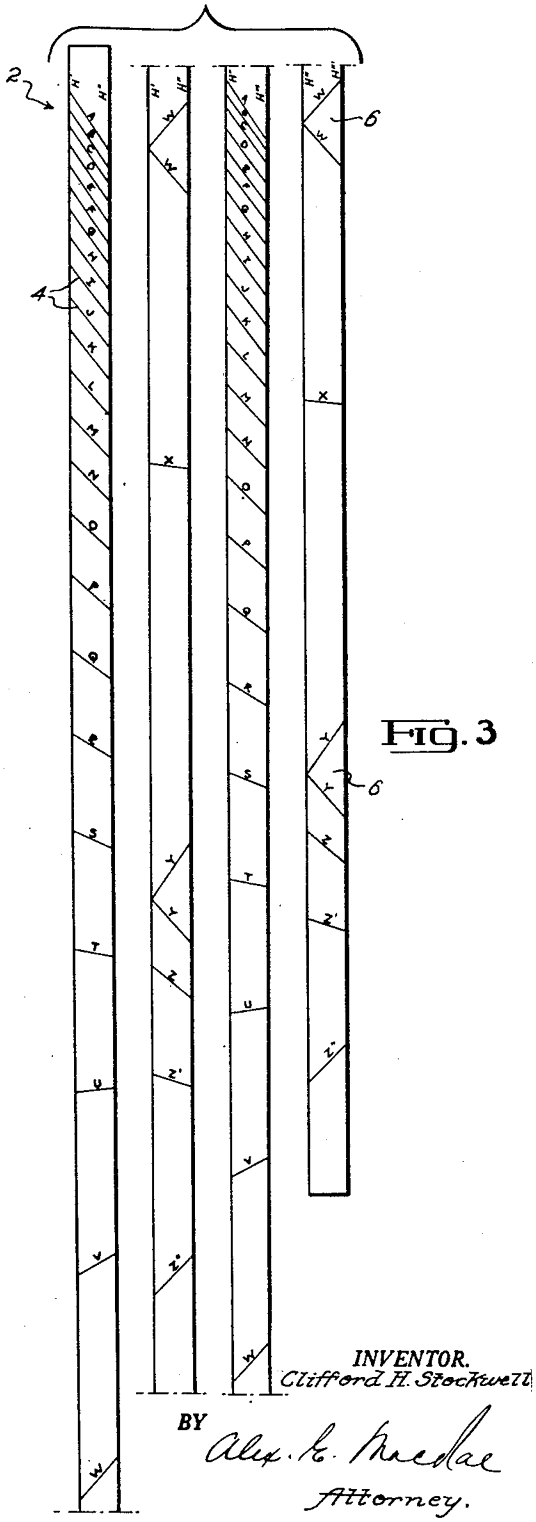
Figure 3 is a plan view of the second part of the graph shown in skeleton form.
Figure 4:
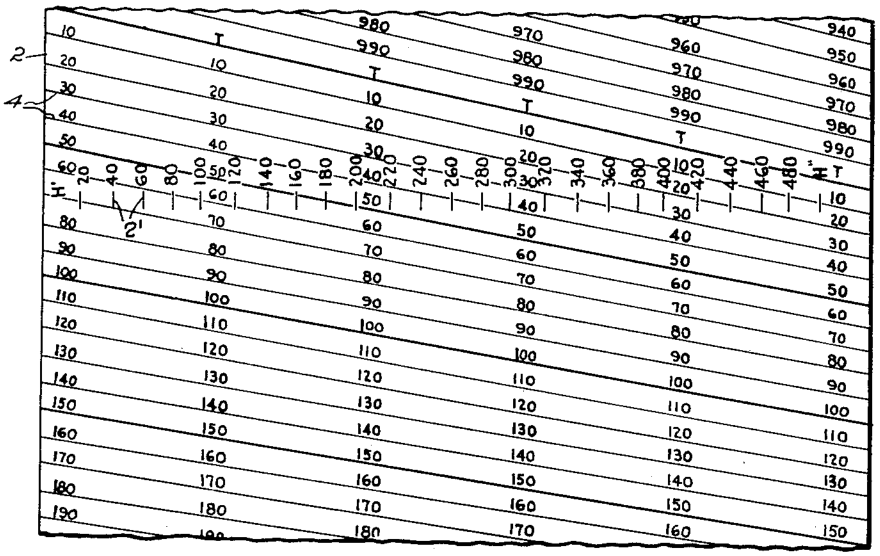
Figure 4 is a plan view of a portion of the graph part shown in Figure 3, in more detailed form.

Part 2, or the $h$, H graph, is constructed with $h$ as ordinates and H as abscissae, and a satisfactory manner of constructing such graph will now be described. The H values are indicated by vertical lines constituted by the longitudinal edges of the strip 2 and a plurality of intermediate lines 2' parallel to such edges. The H values are plotted at a scale of, say, 1.2 inches for a difference of 100 feet, which scale remains constant throughout the length of the graph. It is unnecessary to draw lines 2' in full throughout the length of the strip, it being preferable to indicate the divisions by a series of short lines (such as illustrated in Figure 4) repeated at intervals along the length of the graph. The letters H', H'', H''' represent various ranges of H values, as indicated in Figure 5, and are applied to sections of the graph, as shown in Figure 3. These ranges are employed for the purpose of very greatly reducing the width of the graph. Thus, when using the graph, H' is mentally taken to be any H value in the even thousands from 3000 to 29,000, whichever is required, as shown in the table of Figure 5. Correspondingly H'' is taken to be an H value 500 greater (for instance, when $H'=3000$, H'' is 3500, etc.). Likewise, when H'' is 3500, H''' is 4000, and so forth. It will be apparent that, without this use of H', H'' and H''', the graph would have to be many times wider than it is, and would be so cumbersome as to seriously affect its use from a practical point of view.

In Figure 4, the values of H shown are in the range from H' to H''. For example, if the height of the aircraft, H, is 29,160 feet, then $H'=29{,}000$ and $H''=29{,}500$ and the line marked 160 is 29,160.

In Figure 3, values of H from H' to H'' are shown in the two columns that make up the left half of the figure, and values of H from H'' to H''' are shown in the two columns that make up the right half.

The $h$ values appear as generally sloping lines 4, which may be slightly curved and which are indicative of and marked for each difference of 10 feet, as clearly shown in Figure 4. For convenience, lines 4 representing 1000 feet divisions are indicated by the letters A, B, C, etc., the marking for the lines in each division being from 10 to 990, as shown.

The position of the $h$ lines is determined from the formula $$p=\frac{fB}{H-h}$$

With $fB$ being given a value of 1,000,000, the absolute parallax is found for each difference of 10 feet in $h$ for the full length of the graph. Taking $H=30{,}000$ feet as an example:

When $h=0$, $H-h=30{,}000$ and $p=33.33$
When $h=10$, $H-h=29{,}990$ and $p=33.34$
When $h=20$, $H-h=29{,}980$ and $p=33.36$ etc.
When $h=26{,}980$, $H-h=3020$ and $p=331.12$
When $h=26{,}990$, $H-h=3010$ and $p=332.23$
When $h=27{,}000$, $H-h=3000$ and $p=333.33$.

Published reciprocal tables may be used in obtaining the values of $p$. The values of $p$ are plotted on the same scale as that used in the $p'$, $fB$ graph when $fB=1{,}000{,}000$, that is in the example being used, .50 parallax to 1 inch, except that in the lower part of the graph, where the values increase very rapidly, they are plotted on $\frac{1}{10}$ of this scale. The plot may be made on a long strip of paper, on which each point is labelled, not with the $p$ value, but with the corresponding $h$ value.

The strip of paper is then placed along the vertical line indicative of the $H=30,000$ feet line on the graph and indicated as the line H''' in Figure 3, and the $h$ points marked off and numbered. The plotting is started on line H''' at the point where it is met by cross line A and ends at the point where it is met by cross line Z''. The scale used from line A to line Y is the same as was used for the $p'$ values in the $p'$, $f$B graph when $fB=1,000,000$, that is, .1 parallax to .2 inch. From line Y to line Z'', when the distance between cross lines increased very rapidly, the scale used is $\frac{1}{10}$ of the first scale.

Similarly, for an H value of, say, 29,990, and again using the same formula $$\text{When } h=0,\ H-h=29{,}990, \text{ and } p=\frac{1{,}000{,}000}{29{,}990}=33.34$$

the $h$ values are determined and marked off on the line $H=29,990$, and so on for the other values of H.

It may be observed that, for other values of H, it is unnecessary to repeat the calculations since it will be observed that, for example, the parallax value for $h=0$ when $H=29,990$ is the same as for $h=10$ when $H=30,000$ feet, or, as another illustration, the parallax value for $h=0$ when $H=29,000$ is the same as for $h=1000$ when $H=30,000$. The same long strip of paper can thus be used in plotting all the $h$ points, which are then joined by smooth curves. To greatly shorten the length of the graph and thus render the same not too cumbersome for practical use, a system of indication of the cross lines 4 by letters A, B, C, etc., for the various sections of the graph are employed, as indicated in Figure 3, in conjunction with the table shown in Figure 5.

Thus, in the arrangement shown in Figure 3, it is necessary to plot in this manner only for the range from H29,000 to H30,000, inclusive, as will be seen from the following:

When $H'$ in this figure$=H29,000$ and $H''=H29,500$ and $H'''=H30,000$, curve $A=h0$, curve $B=h1000$, curve $C=h2000$, etc.

Also, when $H'=H28,000$ and $H''=28500$ and $H'''=H29,000$, then curve $B=h0$, curve $C=h1000$, curve $D=H2000$, etc.

The whole range of letters for the $h$ curves and their various values depending on the values of H, is given in the table 5 as shown in Figure 5. This covers directly all the H values from 30,000 to 3,000, which is adequate for most purposes. However, should higher or lower values be required, the same table and graph can be used simply by applying a factor of 10 to the results. For example, for H31,000 feet, the table and graph for 3100 may be used and the $h$ readings multiplied by 10; or for H2155, the table and graph for H21,550 may be used and the $h$ readings divided by 10. Similarly, the usefulness of the graph could be extended to even lower values of H by applying a factor of 100, but only in rare cases would such be required.

The table 5 and graph part 2 are arranged to give directly all $h$ values from sea level up to within 2000 to 3000 feet below H. Rarely will the ground elevations be closer than this beneath the height of the aeroplane but, if so, the graph may still be used in conjunction with a table giving $h$ values up to within 200 to 300 feet below H.

Referring to Figure 3, it will be observed that the graph is broken at curves W and Y, as indicated at 6. This is desirable in order to prevent the slopes of the curves from becoming so steep that they could not be read coveniently or accurately. To cross one of the resulting gaps involves a re-setting of the H—$h$ graph with respect to the $p'$, $f$B graph. However, such slight inconvenience will rarely be encountered since most operations will fall in the range above curve W. It is also desirable to plot curves Y to Z'' on $\frac{1}{10}$ the scale of the other curves. This is because the great increase in scale in this range would otherwise give unnecessarily accurate results. For this section of the graph, the parallax reading obtained on the parallax bar is therefore divided by 10 before the graph is used.

In practice, the various applications of the factor 10 will rarely be necessary, and, even when applied, will scarcely be a source of error as it will be at once apparent if the elevations are ten times too large or ten times too small.

It will be apparent that each graph part, in order to cover the desired range of variables and on a sufficiently large scale to provide accurate results, would be too large and unwieldy to be conveniently used in its original form. Thus, in accordance with the invention, each part of the original graph is reproduced in microscopic scale on a roll, strip or band of film, for subsequent projection of portions thereof as an enlarged image on a screen. A suitable viewer, or viewing instrument, for the projection of such images, will now be described.

Referring to Figures 6 to 9, inclusive, the calculating or viewing instrument therein illustrated comprises a suitable casing 7 in which are mounted two pairs of take-up spools 8 and 9. One pair of spools is adapted to receive and support a roll of film 10, on which is reproduced graph part 1. The other pair of spools are adapted to receive and support a roll of film 11, on which is reproduced graph part 2. Each film may be standard, perforated 35 mm. The spools are mounted in fixed relation on respective shafts 12 and 13, the ends of which are journalled in the side walls of the casing and in an intermediate partition member 14. It will be observed that, as shown, each pair of spools is in vertically spaced relation, the lower spool being positioned somewhat forwardly of the upper spool, and the upper and lower spools being in laterally aligned relation.

Each film in its travel from one spool to the other passes over an upper idler roller 19 and a lower sprocket roller 20 or 20', the sprockets of which fit into the perforations in the film. The rearward surfaces of the rollers 19 and 20 or 20' are vertically aligned to provide a vertically travelling portion of each film.

Means are provided for manually rotating sprocket rollers 20, 20' either independently of each other or in unison to cause corresponding travelling movement of the respective films 10 and 11. The rollers 20, 20' are mounted on a shaft 22 having its ends journalled in the side walls of the casing 7, roller 20 being fixed to the shaft for rotation therewith but roller 20' being normally freely rotatable with respect to the shaft. Means for releasably coupling roller 20' to the shaft for rotation therewith comprises a friction disc 23 fixed to the shaft and engaging one end of roller 20', a coil spring 24 engaging the other end of roller 20′, and lock nuts 25 to adjust the frictional contact pressure between the friction disc and roller as applied by the spring 24. Separate means for applying direct rotative movement to each roller 20, 20′ comprises a handwheel 26, having a turning knob 26′, fixed to a shaft 27, journalled in the side wall of the casing and in member 14, a gear 28 fixed to shaft 27, and a gear 29 meshing with gear 28 and fixed to a respective roller 20, 20′. It will be apparent that, with roller 20′ frictionally coupled to shaft 22, rotation of either knob will act to rotate both rollers 20, 20′ in unison, but that, by grasping one knob 26′ to restrain it from rotative movement, the other knob 26′ (with its respective roller 20 or 20′) may be rotated against the action of friction disc 23 to provide independent rotation of each roller 20, 20′ and consequent relative longitudinal adjustment of each film 10, 11 with respect to the other. It will also be apparent that the frictional contact of friction disc 23 with roller 20′ is such that slippage therebetween takes place only when one roller 20, 20′ is manually restrained from rotating.

Resilient means connecting each pair of shafts 12 and 13 are provided to hold the film taut between the respective spools of each pair and to allow for increasing and decreasing diameters as the film is wound or unwound from one spool to the other. Such means comprises a non-slip belt or chain 15 engaging a wheel or sprocket 16 journalled on shaft 12 and a wheel or sprocket 17 fixed to shaft 13, sprocket 16 being connected to shaft 12 by means of a spiral spring 18 having one end fixed to shaft 12 and the other end fixed to sprocket 16.

It will be observed that only one of each pair of spools has a resilient connection as described. Thus, tension on the spring 18 holds the film taut against the equal and opposite pull on the connecting chain 15. As the spool is rotated, the spring 18 revolves as a whole therewith. The rate of revolution of one spool with respect to the other varies slightly due to the increase or decrease in diameters as the film is wound or unwound. The change in diameters (and corresponding relative rates of revolution) are taken up by a gradual and slight increase or decrease in the tension of the spring 18. Thus, the film is held taut in all positions and there is no tendency for it to run back when the hand knob 26 is released. Considerable lengths of film may be employed in the arrangement illustrated. For instance, nine feet of film can be rolled from one spool to the other with a tightening of the spiral spring of by only about one-half a turn. The tension of spring 18 may be set as desired before the film or belt is attached and this tension then remains substantially constant throughout the range of operation.

Means for holding the rollers and films in any position to which they are moved by knobs 26′ may comprise a leaf spring 30, through which shaft 22 extends, and a pair of lock nuts 31 mounted on the shaft and in frictional engagement with the spring. It will be apparent that the lock nuts may be adjusted to vary the frictional pressure as desired.

Means for projecting images from the films includes a pair of laterally aligned lamps 32, mounted in a rearward compartment 33 of the casing. The beam of light 34 from the filament 35 of each lamp passes through a heat-absorbing glass sheet 36, a pair of condenser lenses 37, thence through the respective section of film 10 or 11, and a pair of projection lenses 38. The pair of beams are reflected downwardly by an inclined first surface mirror 39 and then upwardly by an inclined first surface mirror 40, the mirrors being suitably mounted in the casing 7 as shown. Finally, the pair of images, in juxtaposed relation, as indicated at 42 and 43, are thrown on a screen 41. It will be observed that the screen 41 is mounted in a recessed well 41′ in the upper portion of the casing, for adequate shading from extraneous light and for convenient viewing by the operator.

For satisfactory operation of the viewer described, the following details are given by way of example only:

Focal length of projection lenses—2 inches.
Useful diameter of projection lenses—.8 inch.
Magnification—6.7X.
Size of light filaments—.4 inch x 1.2 inch.
Focal length of condenser lenses—.86 inch.

The condenser is shown as a cylindrical lens to illuminate the full width of about .94 inch of the graphs but only .45 inch of their length.

Only a part of the full width of each graph is seen on the screen at one setting. Lateral movement of the projected image for the purpose of bringing it to any desired position is accomplished by lateral movement of the projection lenses 38. This is effected by means connected to each lens 38 comprising a worm screw 44 journalled in the casing and from which the lens mount 46 is suspended, and a manual turning knob 45 fixed to each worm screw outside the casing for convenient rotation and consequent lateral adjustment of the frame and lens. The lenses and lens mounts are held in a vertical position by plates 47 along which the mounts slide as the knobs 45 are turned.

It is apparent that the image of the right hand graph will be projected onto the right half of the screen and that of the left hand graph onto the left half of the screen. In order to prevent the projected images from overlapping, a pair of Polaroid glasses 48, 48′ are preferably placed in the paths of the respective light beams and are oriented at right angles to one another. It is also proposed that the viewer screen 41 be constituted by a pair of sheets of Polaroid glass 49, 49′, frosted on the upper side. Sheet 49 is oriented parallel with glass 48 and sheet 49′ parallel with glass 48′.

The junction of the two Polaroid sheets 49, 49′ makes a sharp fore and aft line 50, dividing the screen in half. A short cross hair 51 is preferably marked across the screen as shown.

A viewing instrument, such as described above, may be constructed of convenient size. Such size need not exceed, for instance, one foot long by eight inches high by six inches wide.

In operation, knob 45 connected to the lens 38 through which the image of graph part 1 on film 10 is projected is turned until the desired /B number coincides with line 50 on the screen. Knob 45 connected to the other lens 38 through which the image of graph part 2 on film 11 is projected is then turned until the desired H number coincides with the same line 50. These two settings usually suffice for a whole flight, in which an average photo base may be used. Film 11 is then moved by rotating respective knob 26′ (film 10 being retained in stationary position by holding its respective knob 26′) until the elevation of control point on the graph image falls at cross hair 51. Film 10 is then moved in the same manner (film 11 being held stationary in its set position) until the corresponding parallax reading falls at the cross hair 51. With this setting, either knob 26 may be turned to cause both films to travel in unison, whereby, for any parallax reading falling at the cross hair 51, the corresponding elevation may also be read at the cross hair. Desired corrections of the elevations for tilt may later be made if desired.

It will be recognized that a number of variations may be made in the arrangement of the graph and in the design of the viewing instrument.

What is claimed is:

1. A viewing instrument for at least two indicia-bearing bands of film comprising a casing, a pair of supporting spools for each film band, a screen, means for simultaneously projecting an image from a portion of each film band in laterally aligned relation on said screen, said means including a projection lens for each film band, means mounting said lenses in the casing for lateral adjustment with respect to each other to adjust laterally the portion of said images on the screen, said screen comprising a pair of laterally aligned and angularly oriented Polaroid glass sheets, said sheets having meeting edges along the longitudinal center line of the screen, and manually operable means for causing travelling movement of said each film band selectively in unison with and independently of each other to project images of desired portions of the graphs on the screen.

2. A viewing instrument for at least two indicia-bearing bands of film comprising a casing, having a recessed well in the upper portion thereof, a pair of supporting spools for each film band, a screen mounted at the base of said well for shading from extraneous light, means for simultaneously projecting an image from a portion of each film band in laterally aligned relation on said screen, said means including a projection lens for each film band, means mounting said lenses in the casing for lateral adjustment with respect to each other to adjust laterally the portion of said images on the screen, and reflectors for directing the projected images onto said screen, said screen comprising a pair of laterally aligned and angularly oriented sheets, said sheets having meeting edges along the longitudinal center line of the screen, and manually operable means for causing travelling movement of each film band selectively in unison with and independently of each other to project images of desired portions of the graphs on the screen.

CLIFFORD H. STOCKWELL.

References Cited in the file of this patent

UNITED STATES PATENTS

| Number | Name | Date |
|---|---|---|
| 520,114 | Johnson | May 22, 1894 |
| 753,840 | Barth et al. | Mar. 8, 1904 |
| 1,794,147 | Chidester | Feb. 24, 1931 |
| 1,894,684 | Hawk | Jan. 17, 1933 |
| 1,918,468 | Harding | July 18, 1933 |
| 1,962,805 | Chenicek et al. | June 12, 1934 |
| 2,008,982 | Hopkins | July 23, 1935 |
| 2,301,274 | Greiser | Nov. 10, 1942 |
| 2,375,878 | Willens | May 15, 1945 |
| 2,511,270 | Kahan | June 13, 1950 |